(12) United States Patent
Obuchi

(10) Patent No.: US 10,081,324 B2
(45) Date of Patent: Sep. 25, 2018

(54) AUTOMATIC ALERTING DEVICE AND AUTOMATIC ALERTING METHOD

(71) Applicants: Robert Bosch GmbH, Stuttgart (DE); Bosch Corporation, Tokyo (JP)

(72) Inventor: Hisashi Obuchi, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/320,778

(22) PCT Filed: May 28, 2015

(86) PCT No.: PCT/JP2015/065384
§ 371 (c)(1),
(2) Date: Dec. 21, 2016

(87) PCT Pub. No.: WO2015/198786
PCT Pub. Date: Dec. 30, 2015

(65) Prior Publication Data
US 2017/0151922 A1    Jun. 1, 2017

(30) Foreign Application Priority Data

Jun. 24, 2014  (JP) ................................ 2014-129220

(51) Int. Cl.
*B60R 21/0136* (2006.01)
*B60Q 1/52* (2006.01)
(Continued)

(52) U.S. Cl.
CPC ............ *B60R 21/0136* (2013.01); *B60Q 1/52* (2013.01); *B60Q 5/005* (2013.01); *G08B 21/00* (2013.01);
(Continued)

(58) Field of Classification Search
None
See application file for complete search history.

(56) References Cited

U.S. PATENT DOCUMENTS

| 2003/0182041 A1* | 9/2003 | Watson ............... B60R 21/0132 701/45 |
| 2005/0275522 A1* | 12/2005 | Nitz ........................ B60Q 1/52 340/471 |
| 2014/0176347 A1* | 6/2014 | Kim ................. G08G 1/096716 340/907 |

FOREIGN PATENT DOCUMENTS

| DE | 10 2012 107 186 A1 | 2/2014 |
| JP | 2001-027647 A | 1/2001 |

(Continued)

OTHER PUBLICATIONS

International Search Report corresponding to PCT Application No. PCT/JP2015/065384, dated Jul. 14, 2015 (Japanese and English language document) (5 pages).

*Primary Examiner* — Jonathan M Dager
*Assistant Examiner* — Garrett F Evans
(74) *Attorney, Agent, or Firm* — Maginot, Moore & Beck LLP

(57) ABSTRACT

Provided are an automatic alerting device and an automatic alerting method capable of producing an alert indicating that there has been a vehicle accident to those nearby the site of the accident. The automatic alerting device has: a state-detecting unit for detecting a vehicle state; an accident-determining unit for determining, on the basis of the vehicle state detected by the state-detecting unit, whether or not a vehicle accident has occurred; an alerting unit for producing an alert to the outside of the vehicle; and a control unit for controlling the alerting unit. The alerting unit has: an alarm that emits a sound to the outside of the vehicle; and a hazard lamp that emits light on the outside of the vehicle. When the accident-determining unit determines that there has been a vehicle accident, the control unit makes the alarm emit a sound and the hazard lamp emit light.

16 Claims, 2 Drawing Sheets

(51) Int. Cl.
*B60Q 5/00* (2006.01)
*G08B 21/00* (2006.01)
*B60R 21/01* (2006.01)
*B60R 21/00* (2006.01)

(52) U.S. Cl.
CPC ............ *B60R 2021/0027* (2013.01); *B60R 2021/0104* (2013.01); *B60R 2021/01013* (2013.01)

(56) References Cited

FOREIGN PATENT DOCUMENTS

| | | | |
|---|---|---|---|
| JP | 2001-328580 | A | 11/2001 |
| JP | 2003-109161 | A | 4/2003 |
| JP | 2003-194576 | A | 7/2003 |
| JP | 2004-093537 | A | 3/2004 |
| WO | 2007/044744 | A2 | 4/2007 |
| WO | 2007/083666 | A1 | 7/2007 |
| WO | 2012/085324 | A1 | 6/2012 |

* cited by examiner

AUTOMATIC ALERTING DEVICE AND AUTOMATIC ALERTING METHOD

This application is a 35 U.S.C. § 371 National Stage Application of PCT/JP2015/065384, filed on May 28, 2015, which claims the benefit of priority to Serial No. JP 2014-129220, filed on Jun. 24, 2014 in Japan, the disclosures of which are incorporated herein by reference in their entirety.

The present disclosure relates to an automatic alerting device and an automatic alerting method, for automatically providing an alert to the outside that a vehicle has been involved in an accident.

BACKGROUND

Touring in rugged mountainous regions on off-road motorcycles has become popular among many riders in recent years. Particularly rugged mountains are unpopular and there are also a non-negligible number of locations which are not reached by radio waves from mobile telephones etc. If an accident occurs when a rider is touring alone on such a mountain, an injured rider cannot hope for another rider to happen to pass by the accident site.

There is a known device for detecting that an accident has occurred and for automatically sending to the outside a message requesting help when an accident involving a vehicle overturning etc. occurs in regard to a vehicle such as a two-wheeled vehicle (see Patent Document 1).

Patent Document 1: WO 2012/085324

SUMMARY

If a rider is seriously injured, it is very important for such injuries to be treated as soon as possible in order to save the rider's life. There is a problem, however, in that even if a message requesting assistance is sent to the outside, it takes a very long time for rescuers to reach the site of an accident in a rugged mountainous area. Furthermore, even if the rescuers in a rescue team that has received a message requesting assistance have embarked on a rescue operation, it is difficult for the rescuers to find the injured person if the rescue operation is taking place at night or in adverse weather conditions, so there is a problem in that it takes time to find the injured person. It would therefore be preferable for another rider passing close to the accident site to rescue the injured person from the point of view of being able to rescue the injured person at an early stage.

However, even if another rider passes close to the accident site, there is still a risk that the other rider might pass by without noticing the vehicle and the injured person involved in the accident if this occurs during the night or in adverse weather conditions. In particular, if the injured person and the vehicle have fallen from a cliff or the like because of the accident and are therefore remote from the path traveled by riders, it will be difficult for the other rider to find the injured person and the vehicle. In such a situation, it is also often difficult for the injured person to request assistance by calling out because the injured person may be unconscious or the like.

Furthermore, according to the abovementioned prior art, a message is automatically sent when an accident has occurred, so even if a rescuer such as another rider is close by, the message is still sent to request assistance. This means that even if another rider is able to give assistance, there is a risk of an unnecessary assistance request being made.

The present disclosure has been devised in light of the abovementioned problems, and an aim thereof lies in providing an automatic alerting device and an automatic alerting method which make it possible to provide an alert that an accident has occurred to a person close to where the accident has occurred, when a vehicle has been involved in an accident.

Furthermore, another aim of the present disclosure lies in providing an automatic alerting device and an automatic alerting method for detecting a vehicle accident and also for providing an alert that an accident has occurred when a rescuer is not nearby.

In order to achieve the abovementioned aims, an automatic alerting device according to a first mode of the present disclosure is an automatic alerting device for automatically providing an alert that a vehicle has been involved in an accident, said device comprising: a state detection unit for detecting the state of the vehicle; an accident determination unit for determining whether or not the vehicle has been involved in an accident, in accordance with the vehicle state detected by the state detection unit; an alert unit for providing an alert to outside of the vehicle; and a control unit for controlling the alert unit, wherein the alert unit comprises a sound-emitting unit for emitting a sound to outside of the vehicle, and a light-emitting unit for emitting light to outside of the vehicle, and when the accident determination unit determines that the vehicle has been involved in an accident, the control unit causes the sound-emitting unit to emit a sound and also causes the light-emitting unit to emit light.

In order to achieve the abovementioned aims, an automatic alerting device according to a second mode of the present disclosure, which is in accordance with the automatic alerting device of the first mode, is such that the state detection unit comprises a wheel speed sensor for detecting the vehicle wheel speed, and a lateral G sensor for detecting the vehicle lateral G, and the accident determination unit determines whether or not the vehicle has been involved in an accident in accordance with the wheel speed detected by the wheel speed sensor, the absolute value of the vehicle lateral G detected by the lateral G sensor, and the amount of change of the vehicle lateral G detected by the lateral G sensor.

In order to achieve the abovementioned aims, an automatic alerting device according to a third mode of the present disclosure, which is in accordance with the automatic alerting device of the second mode, is such that the accident determination unit determines whether or not the following state has continued for a predetermined time or greater, namely a state in which the wheel speed detected by the wheel speed sensor is equal to or less than a predetermined value, the absolute value of the vehicle lateral G detected by the lateral G sensor is equal to or greater than a predetermined value, and the amount of change of the vehicle lateral G detected by the lateral G sensor is equal to or less than a predetermined value, and when said state is deemed to have continued for a predetermined time or greater, the accident determination unit determines that the vehicle has been involved in an accident.

In order to achieve the abovementioned aims, an automatic alerting device according to a fourth mode of the present disclosure, which is in accordance with the automatic alerting device of any of the first to third modes, is such that the alert unit comprises a communication unit able to send a signal to the outside, and when the accident determination unit has determined that the vehicle has been involved in an accident, the control unit causes the communication unit to send a signal to the outside.

In order to achieve the abovementioned aims, an automatic alerting device according to a fifth mode of the present disclosure, which is in accordance with the automatic alerting device of any of the second to fourth modes, comprises an assistance determination unit for determining whether or not the vehicle has been assisted after the vehicle has been involved in an accident, and the assistance determination unit determines whether or not the vehicle has been assisted in accordance with the amount of change of the vehicle lateral G detected by the lateral G sensor, and when the assistance determination unit determines that the vehicle has been assisted, the control unit stops an alert by the alert unit.

In order to achieve the abovementioned aims, an automatic alerting device according to a sixth mode of the present disclosure, which is in accordance with the automatic alerting device of the fifth mode, is such that the assistance determination unit determines whether or not the amount of change of the vehicle lateral G detected by the lateral G sensor is equal to or greater than a predetermined value, and when the amount of change of the vehicle lateral G detected by the lateral G sensor is deemed to be equal to or greater than a predetermined value, said assistance determination unit determines that the vehicle has been assisted.

In order to achieve the abovementioned aims, an automatic alerting method according to a seventh mode of the present disclosure is an automatic alerting method for automatically providing an alert that a vehicle has been involved in an accident, said method comprising the following steps: a state detection step in which the vehicle state is detected; an accident determination step in which it is determined whether or not the vehicle has been involved in an accident in accordance with the detected vehicle state; and an alert step in which an alert is sent to the outside when it is determined in the accident determination step that the vehicle has been involved in an accident, wherein the alert step involves causing a sound-emitting unit to emit a sound while also causing a light-emitting unit to emit light, in order to provide an alert to the outside.

In order to achieve the abovementioned aims, an automatic alerting method according to an eighth mode of the present disclosure, which is in accordance with the automatic alerting method of the seventh mode, is such that the state detection step comprises a step in which the wheel speed of the vehicle, the absolute value of the vehicle lateral G and the amount of change of the vehicle lateral G are detected, and the accident determination step determines whether or not the vehicle has been involved in an accident in accordance with the wheel speed, the absolute value of the lateral G and the amount of change of the lateral G detected in the state detection step.

In order to achieve the abovementioned aims, an automatic alerting method according to a ninth mode of the present disclosure, which is in accordance with the automatic alerting method of the eighth mode, is such that the accident determination step determines whether or not the following state has continued for a predetermined time or greater, namely a state in which the wheel speed is equal to or less than a predetermined value, the absolute value of the vehicle lateral G is equal to or greater than a predetermined value, and the amount of change of the vehicle lateral G is equal to or less than a predetermined value, and when said state is deemed to have continued for a predetermined time or greater, it is determined that the vehicle has been involved in an accident.

In order to achieve the abovementioned aims, an automatic alerting method according to a tenth mode of the present disclosure, which is in accordance with the automatic alerting method of any of the seventh to ninth modes, is such that, in the alert step, a signal is sent to the outside in order to provide an alert to the outside when it has been determined in the accident determination step that the vehicle has been involved in an accident.

In order to achieve the abovementioned aims, an automatic alerting method according to an eleventh mode of the present disclosure, which is in accordance with the automatic alerting method of any of the eighth to tenth modes, comprises an assistance determination step in which it is determined whether or not the vehicle has been assisted, in accordance with the amount of change of the vehicle lateral G; and a step in which the alert is stopped when it has been determined in the assistance determination step that the vehicle has been assisted.

In order to achieve the abovementioned aims, an automatic alerting method according to a twelfth mode of the present disclosure, which is in accordance with the automatic alerting method of the eleventh mode, is such that the assistance determination step determines whether or not the amount of change of the vehicle lateral G is equal to or greater than a predetermined value, and when the amount of change of the vehicle lateral G is deemed to be equal to or greater than a predetermined value, it is determined that the vehicle has been assisted.

In order to achieve the abovementioned aims, an automatic alerting device according to a thirteenth mode of the present disclosure is an automatic alerting device for automatically providing an alert that a vehicle has been involved in an accident, said device comprising: a wheel speed sensor for detecting the vehicle wheel speed; a lateral G sensor for detecting the vehicle lateral G; an alert unit for providing an alert to outside of the vehicle; a control unit for controlling the alert unit; and an accident determination unit for determining whether or not the vehicle has been involved in an accident, in accordance with the wheel speed detected by the wheel speed sensor, the absolute value of the vehicle lateral G detected by the lateral G sensor, and the amount of change of the vehicle lateral G detected by the lateral G sensor, wherein the control unit causes the alert unit to provide an alert to the outside when the accident determination unit determines that the vehicle has been involved in an accident.

In order to achieve the abovementioned aims, an automatic alerting device according to a fourteenth mode of the present disclosure, which is in accordance with the automatic alerting device of the thirteenth mode, is such that the accident determination unit determines whether or not the following state has continued for a predetermined time or greater, namely a state in which the wheel speed is equal to or less than a predetermined value, the absolute value of the vehicle lateral G is equal to or greater than a predetermined value, and the amount of change of the vehicle lateral G is equal to or less than a predetermined value, and when said state is deemed to have continued for a predetermined time or greater, it is determined that the vehicle has been involved in an accident.

In order to achieve the abovementioned aims, an automatic alerting device according to a fifteenth mode of the present disclosure, which is in accordance with the automatic alerting device of the thirteenth or fourteenth mode, is such that the alert unit comprises a sound-emitting unit for emitting a sound to outside of the vehicle, and a light-emitting unit for emitting light to outside of the vehicle, and when the accident determination unit determines that the vehicle has been involved in an accident, the control unit causes the sound-emitting unit to emit a sound and also causes the light-emitting unit to emit light.

In order to achieve the abovementioned aims, an automatic alerting device according to a sixteenth mode of the present disclosure, which is in accordance with the automatic alerting device of any of the thirteenth to fifteenth modes, is such that the alert unit comprises a communication unit able to send a signal to the outside, and when the accident determination unit has determined that the vehicle has been involved in an accident, the control unit causes the communication unit to send a signal to the outside.

In order to achieve the abovementioned aims, an automatic alerting device according to a seventeenth mode of the present disclosure, which is in accordance with the automatic alerting device of any of the thirteenth to sixteenth modes, comprises an assistance determination unit for determining whether or not the vehicle has been assisted after the vehicle has been involved in an accident, wherein the assistance determination unit determines whether or not the vehicle has been assisted in accordance with the amount of change of the vehicle lateral G, and when the assistance determination unit determines that the vehicle has been assisted, the control unit stops an alert by the alert unit.

In order to achieve the abovementioned aims, an automatic alerting device according to an eighteenth mode of the present disclosure, which is in accordance with the automatic alerting device of the seventeenth mode, is such that the assistance determination unit determines whether or not the amount of change of the vehicle lateral G is equal to or greater than a predetermined value, and when the amount of change of the vehicle lateral G is deemed to be equal to or greater than a predetermined value, said assistance determination unit determines that the vehicle has been assisted.

In order to achieve the abovementioned aims, an automatic alerting method according to a nineteenth mode of the present disclosure is an automatic alerting method for automatically providing an alert that a vehicle has been involved in an accident, said method comprising the following steps: a detection step in which the wheel speed of the vehicle, the absolute value of the vehicle lateral G and the amount of change of the vehicle lateral G are detected; an accident determination step in which it is determined whether or not the vehicle has been involved in an accident in accordance with the wheel speed, the absolute value of the lateral G and the amount of change of the lateral G; and an alert step in which an alert is sent to the outside when it is determined in the accident determination step that the vehicle has been involved in an accident.

In order to achieve the abovementioned aims, an automatic alerting method according to a twentieth mode of the present disclosure, which is in accordance with the automatic alerting method of the nineteenth mode, is such that the accident determination step determines whether or not the following state has continued for a predetermined time or greater, namely a state in which the wheel speed is equal to or less than a predetermined value, the absolute value of the vehicle lateral G is equal to or greater than a predetermined value, and the amount of change of the vehicle lateral G is equal to or less than a predetermined value, and when said state is deemed to have continued for a predetermined time or greater, it is determined that the vehicle has been involved in an accident.

In order to achieve the abovementioned aims, an automatic alerting method according to a twenty-first mode of the present disclosure, which is in accordance with the automatic alerting method of the nineteenth or twentieth mode, is such that, in the alert step, a sound-emitting unit is made to emit a sound and a light-emitting unit is also made to emit light in order to provide an alert to the outside when it has been determined in the accident determination step that the vehicle has been involved in an accident.

In order to achieve the abovementioned aims, an automatic alerting method according to a twenty-second mode of the present disclosure, which is in accordance with the automatic alerting method of any of the nineteenth to twenty-first modes, is such that, in the alert step, a signal is sent to the outside in order to provide an alert to the outside when it has been determined in the accident determination step that the vehicle has been involved in an accident.

In order to achieve the abovementioned aims, an automatic alerting method according to a twenty-third mode of the present disclosure, which is in accordance with the automatic alerting method of any of the nineteenth to twenty-second modes, comprises an assistance determination step in which it is determined whether or not the vehicle has been assisted, in accordance with the amount of change of the vehicle lateral G; and a step in which the alert is stopped when it has been determined in the assistance determination step that the vehicle has been assisted.

In order to achieve the abovementioned aims, an automatic alerting method according to a twenty-fourth mode of the present disclosure, which is in accordance with the automatic alerting method of the twenty-third mode, is such that the assistance determination step determines whether or not the amount of change of the vehicle lateral G is equal to or greater than a predetermined value, and when the amount of change of the vehicle lateral G is deemed to be equal to or greater than a predetermined value, it is determined that the vehicle has been assisted.

DETAILED DESCRIPTION

A mode of embodiment of the present disclosure will be described below with reference to the drawings. An automatic alerting device according to a mode of embodiment of the present disclosure is provided on a vehicle such as a two-wheeled vehicle or a four-wheeled vehicle, for example. According to the example in this mode of embodiment, a description will be given where the automatic alerting device is provided on a two-wheeled vehicle, but this is not limiting.

Figure 1:
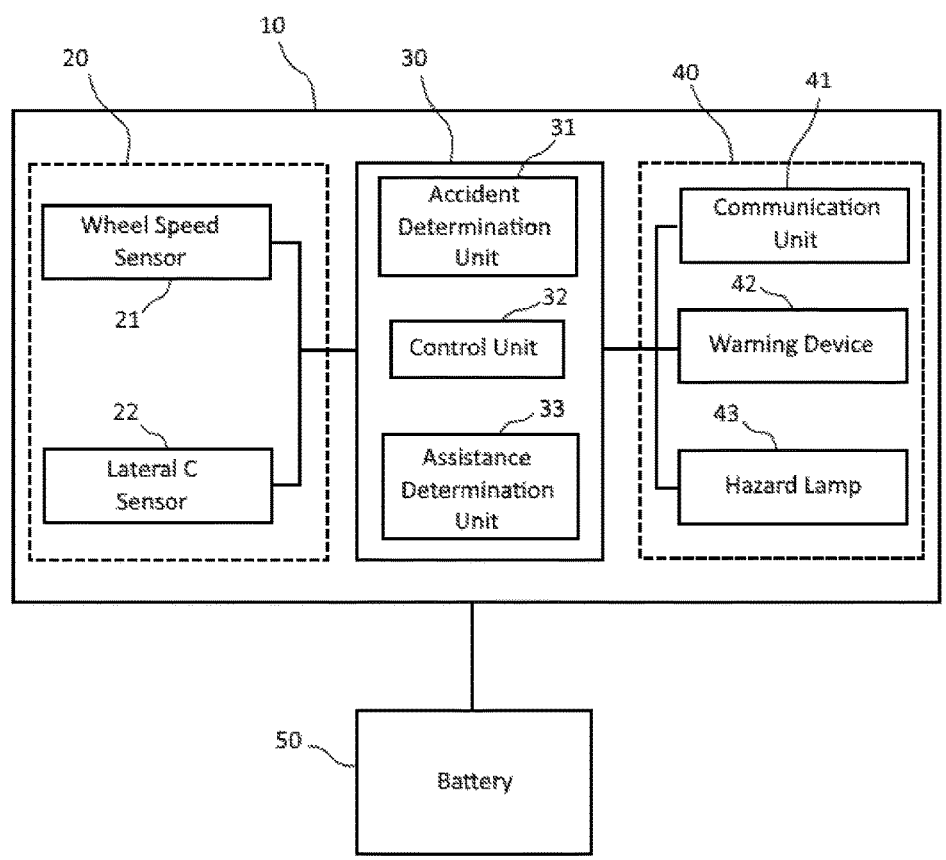
FIG. 1 is a functional block diagram of an automatic alerting device according to a mode of embodiment of the present disclosure.

FIG. 1 is a functional block diagram of the automatic alerting device according to a mode of embodiment of the present disclosure. As illustrated in FIG. 1, an automatic alerting device 10 according to a mode of embodiment of the present disclosure comprises: a state detection unit 20 for detecting the state of a vehicle; an electronic control unit (ECU) 30 adapted in such a way as to be able to receive a signal (information) from the state detection unit 20; and an alert unit 40 for providing an alert to the outside that the two-wheeled vehicle has been involved in an accident. The automatic alerting device 10 is electrically connected to a vehicle battery 50 and is driven by means of power supplied by the battery 50.

The state detection unit 20 comprises: a wheel speed sensor 21 adapted in such a way as to be able to detect the speed of wheels of the two-wheeled vehicle; and a lateral G sensor 22 adapted in such a way as to be able to detect the value of the lateral G of the two-wheeled vehicle. It should be noted that in this instance "lateral G" refers to the gravitational acceleration applied in a lateral direction (sideways) with respect to the body of the two-wheeled vehicle.

The wheel speed sensor 21 sends the detected value of the wheel speed of the two-wheeled vehicle to the ECU 30. The lateral G sensor 22 sends the detected value of the lateral G of the two-wheeled vehicle to the ECU 30.

The ECU 30 comprises: an accident determination unit 31 for determining whether or not the two-wheeled vehicle has been involved in an accident, in accordance with the state of the two-wheeled vehicle detected by the state detection unit 20; a control unit 32 which is adapted in such a way as to control the alert unit 40; and an assistance determination unit 33 for determining whether or not the two-wheeled vehicle has been assisted.

The accident determination unit 31 is able to determine at least whether or not the two-wheeled vehicle is traveling, in accordance with the value of the wheel speed received from the wheel speed sensor 21. That is to say, the accident determination unit 31 is able to recognize that the two-wheeled vehicle is in a substantially stopped state when the value of the wheel speed received from the wheel speed sensor 21 is equal to or less than a predetermined value.

The accident determination unit 31 is adapted in such a way as to calculate the absolute value of the lateral and the amount of change of the lateral G in accordance with the value of the lateral G received from the lateral G sensor 22. The accident determination unit 31 is able to determine at least whether or not the body of the two-wheeled vehicle is in a fallen state, in accordance with the calculated absolute value of the lateral G. That is to say, the accident determination unit 31 is able to recognize that the body of the two-wheeled vehicle is in a fallen state at a predetermined angle or greater when the absolute value of the lateral G is equal to or greater than a predetermined value. Furthermore, the accident determination unit 31 is able to determine at least whether or not the two-wheeled vehicle is in a stopped state in the lateral direction, in accordance with the calculated amount of change of the lateral G. That is to say, the accident determination unit 31 is able to recognize that the two-wheeled vehicle is in a substantially stopped state in the lateral direction when the calculated amount of change of the lateral G is equal to or less than a predetermined value.

If a state in which the wheels of the two-wheeled vehicle are in a substantially stopped state and the body of the two-wheeled vehicle is in a fallen state at a predetermined angle or greater and is also in an essentially stopped state in the lateral direction continues for a predetermined time or greater, it is very likely that the two-wheeled vehicle has been involved in an accident and the two-wheeled vehicle has not been assisted (no one has taken any action to right the two-wheeled vehicle). The accident determination unit 31 is therefore able to indirectly determine, in accordance with the value of the wheel speed received from the wheel speed sensor 21 and the lateral G received from the lateral G sensor 22, that the two-wheeled vehicle has been involved in an accident, that the rider him- or herself is unable to right the two-wheeled vehicle, and that there is no one to provide assistance nearby.

The assistance determination unit 33 is adapted in such a way as to calculate the amount of change of the lateral G in accordance with the value of the lateral G of the two-wheeled vehicle detected by the lateral G sensor 22. The assistance determination unit 33 is able to determine whether or not the two-wheeled vehicle has been assisted, in accordance with the calculated amount of change of the lateral G. Specifically, the assistance determination unit 33 is able to determine that the two-wheeled vehicle is in a moved state (assisted state) when the amount of change of the lateral G is equal to or greater than a predetermined value. The two-wheeled vehicle being assisted means that the rider is only slightly injured or that assistance has arrived. The assistance determination unit 33 therefore determines whether or not the two-wheeled vehicle has been assisted and can thereby indirectly determine that the rider is not in trouble or that assistance has arrived.

The control unit 32 is adapted in such a way as to cause the alert unit 40 to provide an alert when the accident determination unit 31 has determined that the two-wheeled vehicle has been involved in an accident. Furthermore, the control unit 32 is adapted in such a way as to stop an alert from the alert unit 40 when the assistance determination unit 33 has determined that the vehicle has been assisted.

The alert unit 40 comprises: a communication unit 41 having a global positioning system (GPS) or the like adapted in such a way as to be able to send a signal requesting assistance to a rescuer and to institutions providing assistance such as the fire brigade and the police; a warning device 42 (sound-emitting device) for emitting a sound; and a hazard lamp 43 (light-emitting device) for emitting light.

The communication unit 41 is able to send a signal requesting assistance together with location information relating to the two-wheeled vehicle, for example, by means of a command from the control unit 32, said signal being sent to an institution providing assistance via a communication satellite, for example. Furthermore, the communication unit 41 is able to send to an institution providing assistance a signal canceling the signal requesting assistance sent to the institution providing assistance, by means of a command from the control unit 32.

The warning device 42 is able to generate a warning sound to outside of (around) the two-wheeled vehicle by means of a command from the control unit 32. It should be noted that it is possible to use a horn (klaxon) already installed on the two-wheeled vehicle as the warning device 42.

The hazard lamp 43 is able to emit light to outside of (around) the two-wheeled vehicle by means of a command from the control unit 32. It should be noted that it is possible to use the hazard lamp already installed on the two-wheeled vehicle as the hazard lamp 43.

It should be noted that this mode of embodiment describes a case in which the wheel speed sensor 21 and the lateral G sensor 22 are provided as the state detection unit 20, but this is not limiting and it is equally possible to provide another sensor able to detect a vehicle accident as the state detection unit 20. If the vehicle is a four-wheeled vehicle, for example, it is possible to provide a sensor that detects deployment of an airbag. It is possible to indirectly detect that the four-wheeled vehicle has been involved in an accident as a result.

Figure 2:
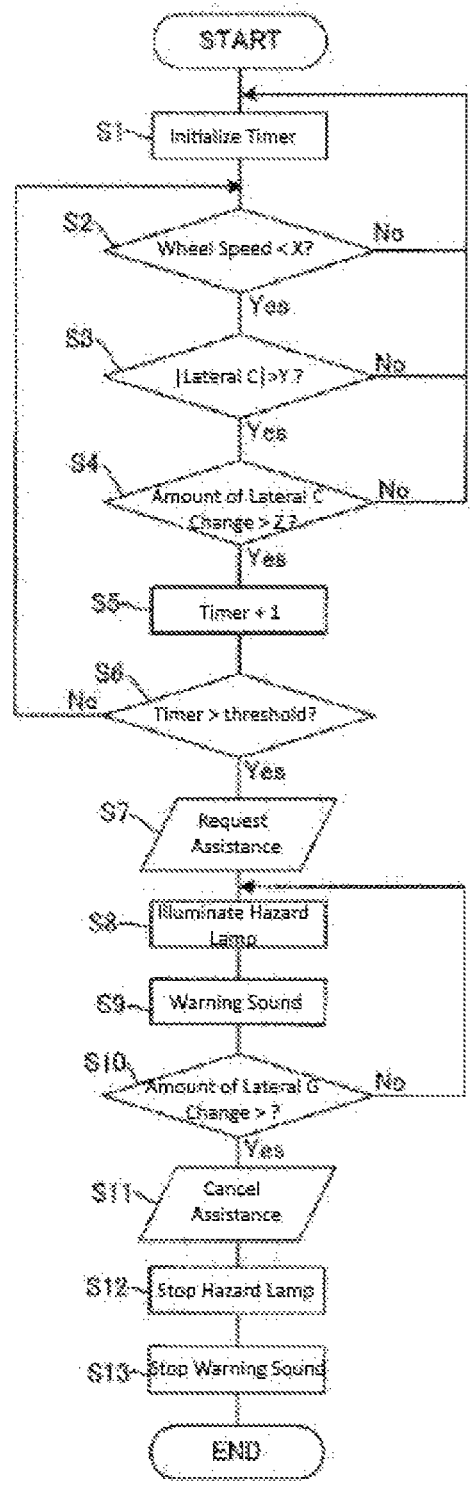
FIG. 2 is a control flow diagram of an automatic alerting method according to a mode of embodiment of the present disclosure.

The automatic alerting method according to the present disclosure will be described next. FIG. 2 is a control flow diagram of an automatic alerting method according to this mode of embodiment. Power is first of all supplied from the battery 50 to the automatic alerting device 10 as a result of the vehicle ignition being switched on. By this means, the automatic alerting device 10 for implementing the automatic alerting method according to the present disclosure is activated, and a timer in the ECU 30 is initialized to 0 (S1).

When the automatic alerting device 10 is activated, the wheel speed sensor 21 detects the wheel speed of the two-wheeled vehicle and sends the detected value of the wheel speed to the ECU 30. The lateral C sensor 22 likewise detects the lateral. G of the two-wheeled vehicle and sends the detected value of the lateral C to the ECU 30. The accident determination unit 31 in the ECU 30 calculates the absolute value and the amount of change of the lateral C from the lateral C value received.

The accident determination unit 31 in the ECU 30 determines whether or not the value of the wheel speed is equal to or less than a predetermined speed, e.g. a speed of 4.0 km/h or less (S2). It should be noted that any value is stored in a memory in the ECU 30 as said predetermined speed. If the accident determination unit 31 determines that the value of the wheel speed is not equal to or less than a predetermined speed (S2, No), the timer in the ECU 30 is once again initialized to 0 (S1).

If the accident determination unit 31 determines that the value of the wheel speed is equal to or less than a predetermined speed (S2, Yes), the accident determination unit 31 then determines whether or not the absolute value of the lateral C is equal to or greater than a predetermined value, e.g. 0.6 Gal or greater (S3). It should be noted that any value is stored in the memory in the ECU 30 as said predetermined value. If the accident determination unit 31 determines that the absolute value of the lateral C is not equal to or greater than a predetermined value (S3, No), the timer in the ECU 30 is initialized to 0 (S1).

If the accident determination unit 31 determines that the absolute value of the lateral G is equal to or greater than a predetermined value (S3, Yes), the accident determination unit 31 then determines whether or not the amount of change of the lateral G is equal to or greater than a predetermined value, e.g. equal to or greater than 2.0 m/s$^2$ (S4), It should be noted that any value is set in the memory in the ECU 30 as said predetermined value. If the accident determination unit 31 determines that the amount of change of the lateral G is not equal to or greater than a predetermined value (S4, No), the timer in the ECU 30 is initialized to 0 (S1).

If the accident determination unit 31 determines that the amount of change of the lateral G is equal to or greater than a predetermined value (S4, Yes), the ECU 30 adds 1 to the timer (S5). It should be noted that step S2 to step S4 described above are repeated at predetermined times, e.g. every 20 ms. The interval at which step S2 to step S4 are performed may be set as appropriate.

The accident determination unit 31 determines whether or not the count value of the timer has exceeded a predetermined value, e.g. 90 (S6). It should be noted that any value is set in the memory in the ECU 30 as said predetermined value. The count number of the timer is added at predetermined times (e.g., every 20 ms), so the count value of the timer represents the time from when an accident occurred.

If the accident determination unit 31 determines that the count value of the timer does not exceed a predetermined value (S6, No), the process returns to step S2, and step S2 to step S5 are repeated. If the accident determination unit 31 determines that the count value of the timer has exceeded a predetermined value (S6, Yes), it is very likely that an accident has occurred and that the two-wheeled vehicle has not been assisted in a predetermined time (no one has taken any action to right the two-wheeled vehicle). In this case, the accident determination unit 31 therefore determines that the two-wheeled vehicle has been involved in an accident and the control unit 32 causes the alert unit 40 to provide an alert to the outside.

Specifically, the control unit 32 causes the communication unit 41 to send a signal requesting assistance via the GPS or the like to an institution providing assistance (S7). It is possible to automatically request assistance to an institution providing assistance as a result. Furthermore, the control unit 32 illuminates the hazard lamp 43 (S8) while also causing the warning device 42 to generate an intermittent warning sound (S9). As a result of the warning sound being generated, it is possible to notify nearby people able to assist (other riders etc.) that an accident has occurred. In addition, by causing illumination of the hazard lamp 43, it is possible to notify approaching people able to assist of the location of the two-wheeled vehicle.

The assistance determination unit 33 in the ECU 30 receives the value of the lateral G of the two-wheeled vehicle from the lateral G sensor 22, The assistance determination unit 33 calculates the amount of change of the lateral C from the received value of the lateral G, and determines whether or not the amount of change is equal to or greater than a predetermined value, e.g. 2.0 m/s$^2$ or greater (S10). If the assistance determination unit 33 determines that the amount of change of the lateral G is not equal to or greater than a predetermined value (S10, No), the process returns to step S8 and illumination of the hazard lamp 43 (S8) and generation of a warning sound (S9) are continued.

If the assistance determination unit 33 determines that the amount of change of the lateral G is equal to or greater than a predetermined value (S10, Yes), in other words if the assistance determination unit 33 determines that the vehicle has been assisted, the control unit 32 causes the alert unit 40 to stop the alert.

Specifically, the control unit 32 causes the communication unit 41 to send, via the GPS etc., signal canceling the signal requesting assistance to the institution providing assistance (S11). Furthermore, the control unit 32 stops illumination of the hazard lamp 43 (S12) and stops the warning sound from the warning device 42 (S13). As a result, it is possible to prevent an unnecessary assistance request. Furthermore, flashing of the hazard lamp 43 and the warning sound from the warning device 42 can be automatically stopped after the vehicle has been assisted.

As described above, the automatic alerting device 10 and the automatic alerting method according to this mode of embodiment are such that the warning device 42 is caused to emit a sound when the accident determination unit 31 determines that a vehicle has been involved in an accident, and therefore it is possible to alert other riders or rescuers close to the accident site that an accident has occurred. Furthermore, the hazard lamp 43 is illuminated and therefore it is possible to notify other riders or rescuers of the location of the vehicle even in an environment with poor visibility and it is readily possible for the vehicle which has been involved in an accident to be found.

Furthermore, the state detection unit 20 comprises the wheel speed sensor 21 and the lateral G sensor 22 and the accident determination unit 31 determines whether or not the vehicle has been involved in an accident in accordance with the wheel speed, the absolute value of the lateral G and the amount of change of the lateral G. As a result, it is possible to indirectly determine that the rider him- or herself is unable to right the two-wheeled vehicle, and that there is no one to provide assistance nearby. If people able to assist such as other riders are present nearby, it is therefore possible to ensure that an alert is not sent to the outside and therefore it is possible to prevent unnecessary assistance from being requested.

Furthermore, the accident determination unit 31 determines that the vehicle has been involved in an accident when a state in which the wheel speed is equal to or less than a predetermined value, the absolute value of the lateral G is equal to or greater than predetermined value, and the amount of change of the lateral G is equal to or less than a predetermined value continues for a predetermined time or greater. As a result, it is possible to reliably detect that an accident has occurred while also making it possible to prevent erroneous detection of an accident.

When the accident determination unit 31 determines that the vehicle has been involved in an accident, the communication unit 41 sends a signal requesting assistance to the outside. As a result, it is possible to make a request for assistance to an institution providing assistance.

Furthermore, when the assistance determination unit 33 determines that the vehicle has been assisted, it stops the alert from the alert unit 40. As a result, it is possible to prevent an unnecessary request for assistance. In addition, when it is determined that the amount of change of the vehicle lateral G is equal to or greater than a predetermined value, the assistance determination unit 33 determines that the vehicle has been assisted and therefore it is possible to indirectly determine a state such that the driver has been able to move the vehicle or that a person providing assistance is present. The alert from the alert unit 40 can therefore be stopped only when the safety of the driver can be confirmed or when a person providing assistance is present.

In the mode of embodiment described above, when the accident determination unit 31 determines that the two-wheeled vehicle has been involved in an accident, the communication unit 41, warning device 42 and hazard lamp 43 are each made to provide an alert. This is not limiting, however, and at least one of the communication unit 41, warning device 42 and hazard lamp 43 may be used in order to provide an alert to the outside.

It should be noted that the mode of embodiment described above is configured in such a way that the accident determination unit 31 calculates the absolute value and the amount of change of the lateral G in accordance with the value of the lateral. G detected by the lateral G sensor 22, but this is not limiting and it is equally possible to adopt a configuration in which the vehicle is able to detect the absolute value and the amount of change of the lateral G. For example, instead of the lateral G sensor 22, it is equally possible to use a sensor adapted in such a way as to detect the value of the lateral G in order to calculate the absolute value, or a sensor adapted in such a way as to detect the value of the lateral G in order to calculate the amount of change thereof.

It should be noted that, as an additional function of the automatic alerting device 10 according to this mode of embodiment, it is possible to track a stolen vehicle in accordance with GPS location information when the vehicle has been stolen, for example, by utilizing the communication unit 41. Furthermore, as an additional function of the automatic alerting device 10 according to this mode of embodiment, it is also possible to adopt a configuration such that a vehicle turning indicator is canceled when lateral G equal to or greater than a predetermined value is detected, by utilizing the lateral G sensor 22.

A mode of embodiment of the present disclosure has been described above, but the abovementioned mode of embodiment of the disclosure serves to facilitate an understanding of the present disclosure and does not limit the present disclosure. The present disclosure may be modified or improved without departing from the essential point thereof, and may also of course include equivalent elements. Furthermore, any of the constituent elements described in the specification may be combined or omitted within a scope that enables at least part of the abovementioned problem to be solved or within a scope that exhibits at least part of the advantage of the disclosure.

The invention claimed is:

1. An automatic alerting device for automatically providing an alert that a vehicle has been involved in an accident, the device comprising:
   a state detection unit configured to detect a state of the vehicle;
   an accident determination unit configured to determine whether the vehicle has been involved in an accident based on the state of the vehicle detected by the state detection unit;
   an alert unit configured to provide an alert to outside of the vehicle; and
   a control unit configured to control the alert unit,
   wherein the alert unit comprises a sound-emitting unit configured to emit a sound to outside of the vehicle, and a light-emitting unit configured to emit light to outside of the vehicle, and
   wherein the control unit is configured to, in response to the accident determination unit determining that the vehicle has been involved in an accident, control the sound-emitting unit to emit a sound and control the light-emitting unit to emit light,
   wherein the state detection unit comprises a lateral G sensor configured to detect a vehicle lateral G, and
   further comprising an assistance determination unit configured to determine whether the vehicle has been assisted after the vehicle has been involved in an accident based on an amount of change of the vehicle lateral G detected by the lateral G sensor,
   wherein the control unit is configured to, in response to the assistance determination unit determining that the vehicle has been assisted, stop an alert generated by the alert unit.

2. The automatic alerting device as claimed in claim 1, wherein:
   the state detection unit further comprises a wheel speed sensor configured to detect a vehicle wheel speed, and
   the accident determination unit is configured to determine whether the vehicle has been involved in an accident based on the wheel speed detected by the wheel speed sensor, an absolute value of the vehicle lateral G detected by the lateral G sensor, and an amount of change of the vehicle lateral G detected by the lateral G sensor.

3. The automatic alerting device as claimed in claim 2, wherein the accident determination unit is configured to determine that the vehicle has been in an accident in response to (i) the wheel speed detected by the wheel speed sensor being one of equal to and less than a first predetermined value for at least a predetermined time, (ii) the absolute value of the vehicle lateral G detected by the lateral G sensor being one of equal to and greater than a second predetermined value for at least the predetermined time, and (iii) the amount of change of the vehicle lateral G detected by the lateral G sensor being one of equal to and less than a third predetermined value for at least the predetermined time.

4. The automatic alerting device as claimed in claim 1, wherein:
   the alert unit comprises a communication unit configured to send a signal to outside of the vehicle, and
   the control unit is configured to, in response to the accident determination unit determining that the vehicle has been involved in an accident, control the communication unit to send the signal to the outside.

5. The automatic alerting device as claimed in claim 1, wherein:
the assistance determination unit is configured to determine that the vehicle has been assisted in response to an amount of change of the vehicle lateral G detected by the lateral G sensor being one of equal to and greater than a predetermined value.

6. An automatic alerting method for automatically providing an alert that a vehicle has been involved in an accident, the method comprising:
detecting a state of the vehicle;
determining whether the vehicle has been involved in an accident based on the detected state of the vehicle; and
sending an alert to outside of the vehicle in response to it being determined that the vehicle has been involved in an accident, the sending of the alert including controlling a sound-emitting unit to emit a sound and controlling a light-emitting unit to emit light,
wherein the detecting of the state of the vehicle comprises detecting an amount of change of a vehicle lateral G, and
further comprising:
determining whether the vehicle has been assisted based on the amount of change of the vehicle lateral G; and
stopping the alert in response to it being determined that the vehicle has been assisted.

7. The automatic alerting method as claimed in claim 6, wherein:
the detecting of the state of the vehicle further comprises detecting a wheel speed of the vehicle and an absolute value of the vehicle lateral G, and
the determining of whether the vehicle has been in an accident further comprises determining whether the vehicle has been involved in an accident based on the wheel speed, the absolute value of the lateral G and the amount of change of the lateral G.

8. The automatic alerting method as claimed in claim 7, the determining of whether the vehicle has been in an accident further comprising:
determining that the vehicle has been in an accident in response to (i) the wheel speed detected by the wheel speed sensor being one of equal to and less than a first predetermined value for at least a predetermined time, (ii) the absolute value of the vehicle lateral G detected by the lateral G sensor being one of equal to and greater than a second predetermined value for at least the predetermined time, and (iii) the amount of change of the vehicle lateral G detected by the lateral G sensor being one of equal to and less than a third predetermined value for at least the predetermined time.

9. The automatic alerting method as claimed in claim 6, the sending of the alert further comprising:
sending a signal to the outside in response to it being determined that the vehicle has been involved in an accident.

10. The automatic alerting method as claimed in claim 6, the determining of whether the vehicle has been assisted further comprising:
determining that the vehicle has been assisted in response to the amount of change of the vehicle lateral G being one of equal to and greater than a predetermined value.

11. An automatic alerting device for automatically providing an alert that a vehicle has been involved in an accident, the device comprising:
a wheel speed sensor configured to detect a vehicle wheel speed;
a lateral G sensor configured to detect a vehicle lateral G;
an alert unit for configured to provide an alert to outside of the vehicle;
a control unit configured to control the alert unit;
an accident determination unit configured to determine whether the vehicle has been involved in an accident based on the wheel speed detected by the wheel speed sensor, an absolute value of the vehicle lateral G detected by the lateral G sensor, and an amount of change of the vehicle lateral G detected by the lateral G sensor; and
an assistance determination unit configured to determine whether the vehicle has been assisted after the vehicle has been involved in an accident based on the amount of change of the vehicle lateral G detected by the lateral G sensor,
wherein the control unit is configured to control the alert unit to provide an alert to the outside in response to the accident determination unit determining that the vehicle has been involved in an accident, and
wherein the control unit is configured to, in response to the assistance determination unit determining that the vehicle has been assisted, stop an alert of the alert unit.

12. The automatic alerting device as claimed in claim 11, wherein:
the assistance determination unit is configured to determine that the vehicle has been assisted in response to whether an amount of change of the vehicle lateral G detected by the lateral G sensor is one of equal to and greater than a predetermined value.

13. An automatic alerting device for automatically providing an alert that a vehicle has been involved in an accident, the device comprising:
a wheel speed sensor configured to detect a vehicle wheel speed;
a lateral G sensor configured to detect a vehicle lateral G;
an alert unit for configured to provide an alert to outside of the vehicle;
a control unit configured to control the alert unit;
an accident determination unit configured to determine whether the vehicle has been involved in an accident based on the wheel speed detected by the wheel speed sensor, an absolute value of the vehicle lateral G detected by the lateral G sensor, and an amount of change of the vehicle lateral G detected by the lateral G sensor; and
wherein the accident determination unit is configured to determine that the vehicle has been in an accident in response to (i) the wheel speed detected by the wheel speed sensor being one of equal to and less than a first predetermined value for at least a predetermined time, (ii) the absolute value of the vehicle lateral G detected by the lateral G sensor being one of equal to and greater than a second predetermined value for at least the predetermined time, and (iii) the amount of change of the vehicle lateral G detected by the lateral G sensor being one of equal to and less than a third predetermined value for at least the predetermined time.

14. An automatic alerting method for automatically providing an alert that a vehicle has been involved in an accident, said method comprising:
detecting a wheel speed of the vehicle, an absolute value of a vehicle lateral G and an amount of change of the vehicle lateral G;

determining whether or not the vehicle has been involved in an accident based on the wheel speed, the absolute value of the lateral G and the amount of change of the lateral G; and sending an alert to outside of the vehicle in response to a determination that the vehicle has been involved in an accident, wherein an accident determination unit is configured to determine that the vehicle has been in an accident in response to (i) the wheel speed detected by the wheel speed sensor being one of equal to and less than a first predetermined value for at least a predetermined time, (ii) the absolute value of the vehicle lateral G detected by the lateral G sensor being one of equal to and greater than a second predetermined value for at least the predetermined time, and (iii) the amount of change of the vehicle lateral G detected by the lateral G sensor being one of equal to and less than a third predetermined value for at least the predetermined time.

15. An automatic alerting method for automatically providing an alert that a vehicle has been involved in an accident, said method comprising the following steps:

detecting a wheel speed of the vehicle, an absolute value of a vehicle lateral G and an amount of change of the vehicle lateral G are detected;

determining whether or not the vehicle has been involved in an accident based on the wheel speed, the absolute value of the lateral G and the amount of change of the lateral G;

sending an alert to outside of the vehicle in response to a determination that the vehicle has been involved in an accident;

determining whether the vehicle has been assisted based on the amount of change of the vehicle lateral G; and stopping the alert when the amount of change of the vehicle lateral G indicates that the vehicle has been assisted.

16. The automatic alerting method as claimed in claim 14, wherein the determination of whether the vehicle has been assisted further comprises:

determining whether the amount of change of the vehicle lateral G is equal to or greater than a predetermined value; and determining that the vehicle has been assisted when the amount of change of the vehicle lateral G is equal to or greater than the predetermined value.

* * * * *